United States Patent Office 2,926,187
Patented Feb. 23, 1960

2,926,187
2-AMINO-3-(ARYLIMINO)-1,1,3-TRICYANOPROPENES AND PROCESS OF PREPARATION

Lester Russell Melby, Wilmington, Del., assignor to E. I. du Pont de Nemours and Company, Wilmington, Del., a corporation of Delaware No Drawing. Application May 6, 1958
Serial No. 733,263

8 Claims. (Cl. 260—465)

This invention relates to new polyfunctional organic compounds and more particularly to ethylenically unsaturated compounds containing amino, an arylimino and three cyano groups and to the preparation of such compounds.

Polycyano compounds have been the subject of recent investigations in view of the unusual chemical properties exhibited by them. Tetracyanoethylene, for example, has been shown in U.S. 2,762,810 and 2,762,832 to react with amines, such a N-alkylanilines, to produce N-tricyanovinylamines, e.g., an N-alkyltricyanovinylaniline. In U.S. 2,719,861, it has been shown that malononitrile in the presence of an alkali metal is dimerized to an amino tricyanopropene of the formula $NC-CH_2-C(NH_2)=C(CN)_2$. The latter compound has been shown to condense with aldehydes to give butadiene derivatives of the type $$ArCH=C(CN)-C(NH_2)=C(CN)_2$$

I have now found that new compounds of the class 2-amino-3-(arylimino)-1,1,3-tricyano-1-propenes are obtained by base-catalyzed reaction of an aromatic nitroso compound with 2-amino-1,1,3-tricyano-1-propene (also named 2-amino-1,3,3-tricyano-2-propene).

The new compounds of my invention have the formula

wherein Ar is an aromatic radical attached directly to the imino nitrogen by nuclear carbon. The compounds can alternately be named as 3-amino-1-(aryl)-2,4,4-tricyano-1-aza-1,3-butadienes. They are obtained from an aromatic nitroso compound, ArNO, wherein the nitroso group is directly bonded to nuclear carbon of an aromatic radical.

In my novel compounds, the aryl group is of generally 6 to 12 carbons and is directly bonded by nuclear carbon of the aromatic radical to imino nitrogen. The aryl group is one whose nitroso derivative, i.e., ArNO, is available and preferably has 6 to 12 carbons. The aromatic radical can be hydrocarbon such as phenyl, or naphthyl or a nuclear substituted aryl radical wherein any substituent present is substantially inert or non-reactive with the amino or methylene group of 2-amino-1,1,3-tricyano-1-propene under the conditions employed to produce the products of this invention. Useful substituted aromatic radicals include those containing secondary and tertiary amino groups as described herein, halogen, such as p-chlorophenyl, alkoxy such as methoxyphenyl, and aryloxy such as phenoxyphenyl. The compounds of the present invention thus include 2-amino-3-(phenylimino)-1,1,3-tricyano-1-propene;
2-amino-3-(4-methylphenylimino) - 1,1,3 - tricyano-1-propene;
2-amino-3-(4-phenylphenylimino) - 1,1,3 - tricyano-1-propene;
2-amino-3-(α - naphthylimino) - 1,1,3-tricyano-1-propene;
2-amino-3-(4 - chlorophenylimino) - 1,1,3 - tricyano-1-propene;
2-amino-3-(4 - methoxyphenylimino) - 1,1,3-tricyano-1-propene; and
2-amino-3-(4 - phenoxyphenylimino) - 1,1,3 - tricyano-1-propene.

The nitroso compounds employed in the process of this invention are aromatic and include nitrosobenzene, α-nitrosonaphthalene, p-chloro-nitrosobenzene, p-methylnitrosobenzene, p-phenylnitrosobenzene, p - methoxynitrosobenzene, and p-phenoxynitrosobenzene.

The 2-amino-1,1,3-tricyano-1-propene employed as a reactant with the arylnitroso compound can be prepared by the action of an alkali metal on malononitrile as described in U.S. 2,719,861.

The reaction of arylnitroso compounds with 2-amino-1,1,3-tricyano-1-propene takes place in the presence of basic compounds, particularly an alkali metal hydroxide such as, for instance, sodium hydroxide or potassium hydroxide. The amount of base required is quite small, i.e., the amount is catalytic, generally less than 1% by weight of the reactants. Other bases that can be employed include pyridine, pyridinium acetate, piperidine, piperidinium acetate, and alkali metal alkoxides.

It is preferred that the arylnitroso compound and the aminotricyanopropene be present in substantially equimolar amounts since the reaction requires equimolar quantities of each. However, greater proportions of one reactant can be present if desired.

The reaction takes place in the liquid phase. To insure homogeneous reaction conditions, any inert solvent such as lower alkanols, such as ethanol, isopropanol and the like, cyclic ethers such as tetrahydrofuran and dioxane, nitriles such as, for instance, acetonitrile, amides such as, for instance, dimethylformamide, and open chain ethers such as 2-methoxyethanol. The amount of solvent employed is preferably sufficient to insure liquid phase reaction. It is preferred that the condensation product have limited solubility in the solvent to expedite removal of the product from the reaction medium.

The time required for the reaction to take place is generally quite short, varying, say, from a few minutes to a few hours, and is dependent upon the temperature. Temperatures are generally below the boiling point of the solvent, e.g., 40–80° C.

The new arylimino compounds of this invention are obtained in good yield by the above-described reaction of an arylnitroso compound with the aminotricyanopropene. When minimum quantities of solvent are used, the imino compound is deposited as colored crystals which are readily removed by filtration.

The new compounds are particularly useful as textile coloring agents. They have higher extinction coefficients at longer wave lengths than the products obtained by condensation of 2-amino-1,1,3-tricyano-1-propene with an aromatic aldehyde.

The following examples further illustrate the practice of this invention.

EXAMPLE I

*2-amino-3-(4-diethylaminophenylimino)-1,1,3-tricyano 1-propene*

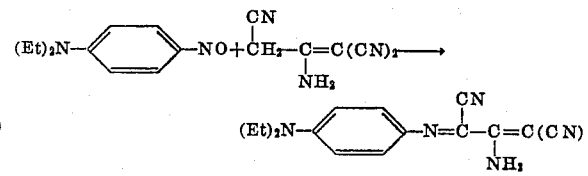

In 25 ml. of warm ethanol there were dissolved 1.79 g. (0.01 mole) of p-nitroso-N,N-diethylaniline and 1.3 g. (0.01 mole) of 2-amino-1,1,3-tricyano-1-propene. Four drops of 10% aqueous sodium hydroxide were added and the mixture was heated at a temperature of 60° C. for 20 minutes and the purple needles were collected on a filter. The yield was 2.52 g. (86%) of solid, M.P. 234-235° C. For analysis, a sample of the compound was recrystallized from a large volume of ethanol. The pure product had a M.P. of 234-235° C.

Analysis.—Calc'd. for $C_{16}H_{16}N_6$: C, 65.7; H, 5.5; N, 28.8. Found: C, 65.9; H, 5.5; N, 29.3.

The visible absorption spectrum of the compound exhibited a maximum at 527 mμ and a molecular extinction coefficient of 45,000.

The infrared absorption spectrum exhibited bands at 2.95μ and 3.05μ assignable to the —$NH_2$ group, 4.55μ characteristic of a conjugated —CN group and at 6.2μ, 6.55μ and 6.8μ assignable to conjugated —C=C— and —C=N—.

EXAMPLE II

*2-amino-3-(4-dimethylaminophenylimino)-1,1,3-tricyano-1-propene*

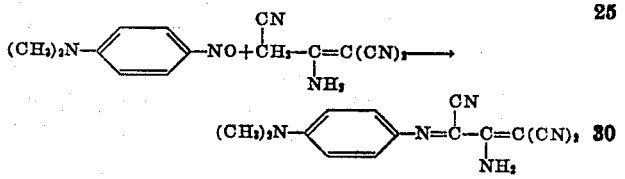

A mixture of 2.5 g. (0.016 mole) of p-nitroso-N,N-dimethylaniline, 2.0 g. (0.015 mole) of 2-amino-1,1,3-tricyano-1-propene, and four drops of 10% aqueous sodium hydroxide in 100 ml. ethanol was heated on a steam bath (60° C.) for two hours. The solid was collected on a filter and dried in vacuo to afford 3.46 g. (87.5% yield) of the dimethylaminophenylimino compound, M.P. 264-265° C.

Analysis.—Calc'd. for $C_{14}H_{12}N_6$: C, 63.3; H, 4.6; N, 31.8. Found: C, 63.9; H, 4.8; N, 32.7.

The compound exhibited $\lambda_{max.}$ 520 mμ (ε=40,650).

EXAMPLE III

*2-amino-3-(4-phenylaminophenylimino)-1,1,3-tricyano-1-propene*

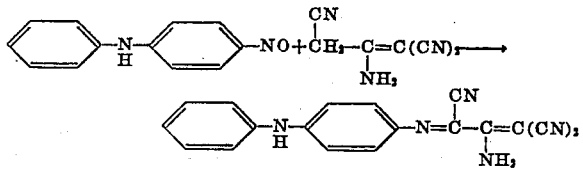

To 50 ml. of ethanol there were added 1.98 g. (0.01 mole) of p-nitrosodiphenylamine, 1.32 g. (0.01 mole) of 2-amino-1,1,3-tricyano-1-propene, and four drops of 10% aqueous sodium hydroxide. The mixture was heated at 60° C. for one hour and filtered to obtain 1.4 g. (45% yield) of blue-black needles, M.P. 234-235° C. It was recrystallized from ethanol and formed glistening olive-green platelets, M.P. 236° C.

Analysis.—Calc'd. for $C_{18}H_{12}N_6$: C, 69.2; H, 3.8; N, 26.9. Found: C, 69.2; H, 4.1; N, 24.7.

The compound exhibited $\lambda_{max.}$ 514 mμ (ε=31,200).

The use of the new compounds of this invention as dyes for textiles is illustrated below.

Twenty milligrams of 2-amino-3-(4-diethylaminophenylimino)-1,1,3-tricyano-1-propene prepared as in Example I was dissolved in 3 ml. of "Cellosolve" and the solution was added to a boiling mixture of 50 ml. of water containing 20 mg. of "Marasperse" (lignin sulfonate dispersing agent) and one drop of glacial acetic acid. Several different fabrics were added to the solution and boiling was continued for 45 minutes. The fabrics were removed, rinsed, and washed for five minutes in boiling water. By this procedure acetate rayon was dyed magenta, "Dacron" (du Pont trademark for polyester fiber) a deep pink, nylon a brownish pink, and wool a medium brown.

The diphenylimino compound of Example III was tested as a disperse dye in the manner described above. It dyed acetate rayon a deep magenta, "Dacron" a deep pink, nylon a deep purple, and wool light brown.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A 2-amino-3-(arylimino)-1,1,3-tricyano-1-propene wherein the aryl group is an aromatic radical of 6 to 12 carbon atoms, directly bonded by nuclear carbon to the imino nitrogen, selected from the group consisting of hydrocarbon, hydrocarbon-oxyphenyl, halohydrocarbon and N-hydrocarbon-aminophenyl radicals.

2. 2-amino-3-(4 - diethylaminophenylimino) - 1,1,3-tricyano-1-propene.

3. 2-amino-3-(4 - dimethylaminophenylimino) - 1,1,3-tricyano-1-propene.

4. 2-amino - 3 - (4 - phenylaminophenylimino)-1,1,3-tricyano-1-propene.

5. Process for preparing 2-amino-3-(arylimino)-1,1,3-tricyano-1-propenes which comprises reacting in the presence of a basic compound 2-amino-1,1,3-tricyano-1- propene with an arylnitroso compound, the nitroso group in said compound being directly bonded to nuclear carbon of the aryl radical, said aryl radical being of 6 to 12 carbon atoms selected from the group consisting of hydrocarbon, hydrocarbon-oxyphenyl, halohydrocarbon and N-hydrocarbon-aminophenyl radicals.

6. Process of claim 5 wherein said basic compound is present in a catalytic amount and is selected from the group consisting of alkali metal hydroxides, alkali metal alkoxides, pyridine, pyridinium acetate, piperidine, and piperidinium acetate.

7. Process of claim 5 wherein said 2-amino-1,1,3-tricyano-1-propene and said aryl nitroso compound are present in substantially equimolar quantities.

8. Process of claim 5 wherein the reaction is effected in liquid phase.

No references cited.